United States Patent [19]
Antonini et al.

[11] 3,926,726
[45] Dec. 16, 1975

[54] METHOD FOR CARRYING OUT ENZYMIC REACTIONS BY MEANS OF THE USE OF BIPHASIC AQUEOUS-ORGANIC SYSTEMS

[75] Inventors: Eraldo Antonini, Rome, Italy; I.S.F. Societa per Azioni, 03, Trezzano Sul Naviglio, both of Italy

[73] Assignees: Snam Progetti S.p.A., Milan; I.S.F. Societa per Azioni, Trezzano Sul Naviglio, both of Italy

[22] Filed: Jan. 11, 1974

[21] Appl. No.: 432,564

[30] Foreign Application Priority Data
Jan. 26, 1973 Italy.................................. 19642/73

[52] U.S. Cl................................ 195/30; 195/51 R
[51] Int. Cl.²............................................ C12B 1/00
[58] Field of Search.......... 195/51 R, 104, 105, 117, 195/119, 28 R, 30, 49, 51 A–51 E, 51 G

[56] References Cited
UNITED STATES PATENTS

| | | | |
|---|---|---|---|
| 2,053,770 | 9/1936 | Dreyfus............................ | 195/119 X |
| 2,676,181 | 4/1954 | Hanze............................... | 195/51 A |
| 3,060,100 | 10/1962 | Wettstein et al.................. | 195/51 A |
| 3,804,714 | 4/1974 | Azoulay et al..................... | 195/28 R |

OTHER PUBLICATIONS

Graubard et al, "Steroid Metabolism:Estrogens a--phenoloases," cited in Chemical Abstracts, Vol. 36:19959.
Fahraeus, "Formation of Laccase by Polyporous Versicolor in Different Culture Media," cited in Chemical Abstracts, Vol. 48:12338i.

*Primary Examiner*—A. Louis Monacell
*Assistant Examiner*—R. B. Penland
*Attorney, Agent, or Firm*—Shlesinger, Fitzsimmons & Shlesinger

[57] ABSTRACT

A method is disclosed for carrying out enzymic reactions in all cases in which the substrates of the enzymic catalyst are water-insoluble, which makes the reaction difficult to complete. The improvement consists in using a solvent for the substrate which is water-immiscible. The solvent in question is selected from among the esters of carboxylic acids of from $C_2$ to $C_{10}$, the alkyl ethers, the alcohols of from $C_4$ to $C_{20}$, aliphatic, aromatic and cycloaliphatic hydrocarbons and halogen-substituted hydrocarbons.

8 Claims, No Drawings

METHOD FOR CARRYING OUT ENZYMIC REACTIONS BY MEANS OF THE USE OF BIPHASIC AQUEOUS-ORGANIC SYSTEMS

This invention relates to a method for carrying out enzymic reactions by the use of biphasic aqueous-organic systems.

It is known that enzymic reactions take place in water since the latter is an ideal solvent for enzymes and guarantees their conformational stability to which their catalytic activity is bound.

This fact imposes a limitation on all those reactions in which water-insoluble starting products (substrates of the enzymic catalyst) have to be used, thus requiring the employment of organic solvents. It is known that these latter generally have a denaturing action on the enzymes, especially when they are water-miscible.

On the other hand, water-immiscible solvents are hardly ever good solvents for enzymes, so that enzymic reactions cannot generally be carried out in a homogeneous organic phase.

This fact imposes a drastic limitation on the performance of enzymic conversions of all those substrates which are sparingly water-soluble, a few of which (steroids, terpenes, lipid derivatives, lyophilic products having pharmacological effect, etc.) are of great interest from the applicative and economic standpoints. There might therefore be envisaged a better dispersion of the substrates by emulsifying them in the aqueous phase of the enzyme; this approach, however, has a number of limitations, both because many of the most common dispersants cause an inactivation of the enzyme, and because this method cannot be applied to substrates having a melting point above room temperature, or slightly above same.

The applicant has now found that it is possible to carry out, with good yields, enzymic conversions of water-insoluble substrates by operating in aqueous-organic biphasic systems such that the organic solvent (water-immiscible) is a good solvent for the substrate, so that the enzyme operates in its natural aqueous environment, a direct denaturing action by the solvent being thus prevented.

The function of the organic solvent is not only that of solubilizing the substrate, but also that of ensuring a constant concentration (virtually the same as saturation in the case of substances which are sparingly water-soluble) in the aqueous phase, wherein the enzymic conversion takes place.

To this "reservoir" function, another is added of extreme importance for the purposes of the reaction rate, and consisting of the continuous extraction of the reaction products from the aqueous phase by the immiscible organic solvent. This is true in those cases (the great majority) in which the enzymic conversion products of insoluble substrates still have a repartition coefficient favourable towards the organic phase.

This effect of extraction of the reaction products cannot be obtained, for example, by emulsifying the substrates, and is an advantageous characteristic of and peculiar to the procedure described herein.

The importance of this extraction of the products is of great significance in certain cases and is not restricted to a shifting of the reaction equilibrium due to action of mass, but is valid, above all, in the numerous cases in which an increase in the concentration of the reaction products in the aqueous medium has an inhibiting action on the catalytic activity of the enzyme.

Without in any way limiting it, the present invention can be applied in the case of enzymic reactions in which the enzyme substrate is water-insoluble or sparingly soluble in water. A particular field of application is that of the enzymic conversions of the steroids, such as oxidations, hydroxylations, dehydrogenations. Other enzymic reactions can advantageously be carried out by adopting the method of this invention, for example the conversion of salicylate into catechol, the oxidation of bihydroxyphenols, the oxidation of aromatic hydrocarbons.

As utilizable organic solvents, the following can be mentioned: esters of carboxylic acids having from 2 to 15 carbon atoms, alkyl ethers of alcohols having from 4 to 10 carbon atoms, aliphatic, aromatic and cycloaliphatic hydrocarbons, halogen-substituted hydrocarbons.

EXAMPLE 1

Lacquase of Laccase

Enzyme source

Purified enzyme from a culture liquor of the Polyporus versicolor fungus.

Reaction

Substrate + $O_2$ lacquase(laccase) → oxidation products of the substrate + $H_2O$.

Activity test

In a typical test, 5 ml of ethyl acetate containing 10 mg/ml of estradiol ($3.6 \times 10^{-2}$M) are emulsified with an equal volume of acetate buffer, 0.1 M, pH = 5.4, containing 0.060 mg/ml ($10^{-6}$M) lacquase(laccase). The mixture is incubated at 25°C under stirring, with pure oxygen or air present in the gaseous phase. At different times, 5 ml of the organic phase are taken off and used for the analysis of the estradiol and of possible products.

Results

After 4 hours, under the test conditions indicated above, one half of the extradiol is converted into products (at least 5) which can be chromatographically distinguished. In similar tests performed in the absence of the organic solvent, by saturating with estradiol the acetate buffer which contains the lacquase(laccase), it was not possible, with the conventional methods of analysis, to evidence the reaction. This is probably due to the too low concentration of the steroid which can be attained in the aqueous phase.

List of the tested substrates.

Conversion takes place, at speeds similar to those observed for estradiol ($t\frac{1}{2}$ = 4 hours) under the indicated test conditions, for the following substrates:

Estradiol, estrone, estriol, equilin, equilenin, diethylstilbestrol.

Many other organic solvents were substituted for ethyl acetate with similar results, for example: trichloroethylene, diethyl ether, ethylene dichloride.

EXAMPLE 2

Hydroxosteroid Dehydrogenase (HSDH)

Enzyme source

From *Pseudomanos testosterono* cells (Sigma H 9004).

Reaction:

Testosterone + NAD⁺ $\xrightarrow{HSDH}$ 4-androsterone, 3,17-dione + NADH + H⁺

HSDH = hydroxosteroid dehydrogenase
NAD = nicotinamide adenine dinucleotide

Test conditions 3.2 ml of phosphate buffer, 0.2 $\mu$ at pH=7.6, containing 2.5 mg of NAD⁺ and 0.05 HSDH units are emulsified with 3.2 ml of an organic solvent containing 13 mg of testosterone ($1.4 \times 10^{-2}$M) at 22°C. The mixture is stirred (100 strokes/min) and at different instants of time the optical density of the aqueous phase is determined at 340 nm.

Test data

| Organic solvent | O.D. 340 nm after 2 hours | O.D. 340 nm after 22 hours |
|---|---|---|
| Ethyl acetate | 1.4 | 3.4 |
| Butyl acetate | 1.3 | 3.2 |
| Ethyl ether | 1.2 | 2.5 |
| Butanol | 0.55 | 1.9 |

O.D.=optical density

With no organic solvent present, the total increase in the optical density at 340 nm is limited by the solubility of testosterone in water (the saturated solution contains 25–30 $\mu$g/ml of testosterone). Thus with no organic solvent present the optical density never exceeds about 0.3.

EXAMPLE 3

Hydroxosteroid Dehydrogenase Plus Lactic Dehydrogenase

Enzyme source

Hydroxosteroid dehydrogenase (HSDH) from Pseudomonas testosteroni cells; Lactic dehydrogenase (LDH) (Böhringer).

Reactions

1. Testosterone + NAD⁺ $\xrightarrow{HSDH}$ androsterone 3,17-dione+NADH+H⁺
2. Pyruvate + NADH + H⁺ $\xrightarrow{LDH}$ lactate + NAD⁺

$$K_1 = \frac{(Andr)(NADH)(H^+)}{(Test)(NAD)} = 26 \cdot 10^{-9}$$

$$K_2 = \frac{(Lact)(NAD^+)}{(Pyr)(NADH)(H^+)} = 0.4 \cdot 10^{12}$$

The equilibrium constant for the reactions 1. and 2. taken together is:

$$K = K_1 \cdot K_2 \frac{(Andr)(Lact)}{(Test)(Pyr)} = 1.07 \cdot 10^4$$

The reaction, under equilibrium conditions, proves to be independent of the concentrations of (H⁺) and NAD⁺ or NADH.

Test method

In a typical test, 3 ml of a buffer solution containing the oxidized co-factor and Na pyruvate, is supplemented with the two free enzymes LDH and HSDH. The aqueous solution is supplemented with an equal volume of the organic phase containing the steroid, and the reaction is started by emulsifying the two phases. The reaction is caused to proceed by shaking the container in a shaking machine at 90 oscillations a minute.

The progress of the various reactions is then determined by ascertaining the quantities of converted and unconverted steroid which are present in the organic phase.

At given moments of time, the phases are mixed, an exact volume of organic phase is taken off and testosterone and androstendione are determined by thin layer chromatography, with the ethyl acetate-benzene-n-hexane system (100:80:60) as eluant.

The steroids are extracted from the support with CHCl₃ (24 hours at room temperature) and, once the CHCl₃ has evaporated off, they are analyzed with a spectrophotometer at 240 nm in EtOH.

Experimental part

Conversion tests were performed under concentration conditions close to the limit concentrations for inhibition of the LDH (0.2 molar pyruvate). The aim was to emphasize how, with small volumes and low amounts of NAD, it is possible to obtain large amounts of converted disteroid, a complete conversion and thus a high degree of purity in the product.

Having used the crude HSDH which contains the isomerase $\Delta^4 - \Delta^5$, these tests were performed at different pH values.

Aqueous phase 1.5 ml of 0.4 molar phosphate buffer
15 Na pyruvate (1 ml H₂O)
1,500 γ NAD (0.5 ml H₂O) 1.5 milligrams
LDH = 1.6 units
HSDH = 0.16 units Organic phase 3 ml butyl acetate
30 mg testosterone

| pH | % conversion after | | | | presence of traces of isomeric steroid |
|---|---|---|---|---|---|
| | 3 hrs. 45 mins. | 22 hrs. | 46 hrs. | 72 hrs. | |
| 6.8 | 14 | 50 | 84 | 93 | yes |
| 7.3 | 18 | 58 | 90 | 95 | yes |
| 7.5 | 20 | 62 | 92 | 100 | yes |
| 8.8 | 30 | 70 | 96 | 100 | no |

It is surmised that the traces of steroid which are found in the thin layer chromatography plates with Rf higher than that of $\Delta^4$ androstendione is the $\Delta^5$ androstendione. From the tabulated data, it can be seen that after 72 hours of reaction at a pH between 7.5 and 8.8 complete conversion is attained, but only at a pH of 8.8 is the reaction product chromatographically pure.

EXAMPLE 4

Lipase

Variable amounts of lipase (Koch-Light cat. 1503 L) were dissolved in 5 ml sodium malate buffer (0.1 M), pH = 6.5. In the first case, 5 ml of enzyme solution was shaken with 2.5 ml olive oil dissolved in 2.5 ml dichloroethane and incubated at 37°C during 1 hour under stirring. In the second case 5 ml of enzyme solution was shaken with 2.5 ml olive oil and incubated at 37°C for 1 hour under stirring.

After that time there was added 30 ml of a mixture in equal parts of acetone-ethanol to break the emulsion and the fatty acids set free by enzymic catalysis were titrated with 0.05 M soda.

The tests data are as follows:

| milligrams Lipase | Test with solvent | Test without emulsion without solvent |
|---|---|---|
|  | $\mu$mols of fatty acid set free in one hour at 37°C | |
| 14.4 | 97 | — |
| 28.8 | 206 | — |
| 43.2 | 310 | 280 |
| 57.6 | 439 | 400 |

EXAMPLE 5

Alcohol Dehydrogenase

Enzyme source: from yeast (Böhringer 15418 EAAD).
Reaction
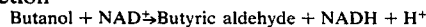
1. Test: with butanol without solvent.

The reaction mixture is composed of 10 ml pyrophosphate buffer (0.1 M), pH = 9, in which the following substances are dissolved:

| semicarbazide . HCl | 12.5 milligrams |
| glycine | 16.7 milligrams |
| reduced glutathione | 3 milligrams |
| NAD | 30 milligrams |

The mixture is incubated with 5 ml butanol with stirring.
2. Test: with butanol admixed with benzene.

The mixture of Test 1 is incubated with a mixture of 5 ml butanol and 5 ml Benzene under stirring at 20°C.

Test data

| | Optical density at 340 nm | |
| Time (mins.) | 1st Test | 2nd Test |
|---|---|---|
| 0 | 0.190 | 0.190 |
| 5 | 3.85 | 3.80 |
| 10 | 4.95 | 5.30 |
| 30 | 7.65 | 9.60 |
| 60 | 9.4 | 12.6 |
| 145 | 10.3 | 15.0 |
| 180 | 11.4 | 16.3 |
| 300 | 11.7 | 17.5 |
| 1320 | 12.2 | 20.4 |

In the presence of butanol alone, a deactivation of the enzyme was found, which explains the fact that in the 1st Test the reaction does not proceed in an appreciable manner after 5 hours.

Under the working conditions of the 2nd Test, it was ascertained, by gaschromatographic analysis, that the concentration of n-Butanol in the aqueous phase, due to a less favourable repartition coefficient, was 3%, and thus much lower than when the aromatic solvent is not present.

What is claimed is:

1. A method for carrying out enzymic conversions of water-insoluble substrates, wherein the enzyme is selected from the group consisting of laccase, hydroxosteroid dehydrogenase, lipase, lactic dehydrogenase and alcohol dehydrogenase, the operation is performed in aqueous organic biphasic systems in the presence of an organic solvent which is immiscible with water but is miscible with, and is, a solvent for the substrate.

2. A method for carrying out enzymic reactions according to claim 1, wherein the solvent is selected from the esters of carboxylic acids having from 2 to 15 carbon atoms, the alkyl ethers of alcohols having from 4 to 10 carbon atoms, aliphatic, aromatic and cycloaliphatic hydrocarbons, and halogen-substituted hydrocarbons.

3. A method according to claim 1, wherein the reaction product is continuously extracted from the aqueous phase by the immiscible organic solvent.

4. A method according to claim 1, wherein the enzyme is laccase,
the substrate is selected from the group consisting of estradiol, estrone, estriol, equilin, equilenin, diethylstilbestrol,
and the solvent is selected from the group consisting of ethyl acetate, trichloroethylene, diethyl ether, ethylene dichloride.

5. A method according to claim 1, wherein the substrate is estradiol and wherein ethyl acetate containing estradiol is emulsified with an equal volume of acetate buffer containing laccase, and the mixture is heated while being stirred with pure oxygen in the gaseous phase.

6. A method as claimed in claim 1 wherein the enzyme is hydroxosteroid dehydrogenase, the substrate is testosterone and nicotinamide adenine dinucleotide is present.

7. A method as claimed in claim 1, wherein the enzyme is hydroxosteroid dehydrogenase plus lactic dehydrogenase, and the substrate is testosterone.

8. A method as claimed in claim 1, wherein the enzyme is lipase, the substrate is olive oil, and the solvent is dichloroethane.

* * * * *

UNITED STATES PATENT OFFICE
CERTIFICATE OF CORRECTION

Patent No. 3,926,726  Dated December 16, 1975

Inventor(s) Eraldo Antonini

It is certified that error appears in the above-identified patent and that said Letters Patent are hereby corrected as shown below:

On the title page, beginning in the line headed by the INID code number [75] cancel "; I.S.F. Societa per Azioni, 03, Trezzano Sul Naviglio, both of Italy".

Signed and Sealed this thirtieth Day of March 1976

[SEAL]

Attest:

RUTH C. MASON
*Attesting Officer*

C. MARSHALL DANN
*Commissioner of Patents and Trademarks*